US006326576B1

(12) United States Patent
Krenz et al.

(10) Patent No.: US 6,326,576 B1
(45) Date of Patent: Dec. 4, 2001

(54) METHOD AND APPARATUS FOR ELECTRICAL DISCHARGE MACHINING

(75) Inventors: Rudi O. Krenz; Willem T. De Graaff, both of Albuquerque; Kenneth E. Mascarenas, Bosque Farms, all of NM (US)

(73) Assignee: General Electric Company, Cincinnati, OH (US)

(*) Notice: Subject to any disclaimer, the term of this patent is extended or adjusted under 35 U.S.C. 154(b) by 0 days.

(21) Appl. No.: 09/401,524

(22) Filed: Sep. 22, 1999

(51) Int. Cl.[7] ............................. B23H 1/00; B23H 1/04; B23H 7/30
(52) U.S. Cl. ............................. 219/69.11; 219/69.17; 219/69.15
(58) Field of Search ................................ 219/69.2, 69.11, 219/69.15, 69.16, 69.17; 204/224 M

(56) References Cited

U.S. PATENT DOCUMENTS

| | | | |
|---|---|---|---|
| 3,739,135 | * | 6/1973 | Pfau et al. . |
| 3,963,894 | | 6/1976 | Wachtell et al. ................... 219/69 E |
| 4,215,261 | * | 7/1980 | Brifford . |
| 4,314,113 | * | 2/1982 | Pfau et al. . |
| 4,347,422 | * | 8/1982 | Schneider . |
| 4,638,141 | | 1/1987 | Houman et al. ................... 219/69 R |
| 4,853,512 | | 8/1989 | Scheider ............................. 219/69.15 |
| 4,891,485 | | 1/1990 | Briffod ............................. 219/69.15 |
| 4,948,933 | * | 8/1990 | Thompson . |
| 5,075,530 | | 12/1991 | Lee .................................... 219/69.11 |
| 5,219,376 | * | 6/1993 | Vinohradsky . |
| 5,290,987 | * | 3/1994 | Davis et al. . |
| 5,530,217 | | 6/1996 | Knecht .............................. 219/69.11 |
| 5,618,450 | * | 4/1997 | Stuart et al. . |
| 5,637,239 | * | 6/1997 | Adamski et al. . |
| 5,847,350 | * | 12/1998 | Dorrel et al. . |
| 5,908,563 | * | 6/1999 | Barbulescu . |
| 5,914,054 | * | 6/1999 | Ito et al. . |
| 6,069,335 | * | 5/2000 | Kinbara . |
| 6,091,041 | * | 7/2000 | Lai . |
| 6,172,319 | * | 1/2001 | Franzen . |

OTHER PUBLICATIONS

"Tech Talk," EDM Today, May/Jun. 1999, pp. 32–33.
Bates, Charles, "Faster and Deeper with Linear," American Machinist, Jun. 1999, pp. 54, 56 and 58.
"Scanning the Horizon," Modern Machine Shop, Jul. 1999, pp. 166 and 168.

* cited by examiner

Primary Examiner—M. Alexandra Elve
Assistant Examiner—Colleen Cooke
(74) Attorney, Agent, or Firm—Andrew C. Hess; V. Ramaswamy

(57) ABSTRACT

An electrical discharge machining (EDM) apparatus includes at least one work station having an electrode fixedly mounted to a base and a workpiece fixture slidingly mounted to the base above the electrode. A servomotor is mounted to the base and arranged to drive the workpiece fixture toward and away from the workpiece. Preferably, the EDM apparatus will include a number of such work stations, and each work station will be connected to a separate control system for independently controlling and energizing the work station.

23 Claims, 3 Drawing Sheets

METHOD AND APPARATUS FOR ELECTRICAL DISCHARGE MACHINING

BACKGROUND OF THE INVENTION

This invention relates generally to electrical discharge machining and more particularly to electrical discharge machining workpieces, such as aircraft engine parts, which have several features machined therein.

Electrical discharge machining (EDM) is a well known process for forming features, such as holes, slots and notches of various shapes and configurations, in an electrically conductive workpiece. Conventional EDM apparatuses typically employ an electrode having the desired shape that is advanced toward the workpiece. A suitable power supply is applied to create an electrical potential between the workpiece and electrode for forming a controlled spark which melts and vaporizes the workpiece material to form the desired feature. The cutting pattern of the electrode is usually computer numerically controlled (CNC) whereby servomotors control the relative positions of the electrode and workpiece. During machining, the electrode and workpiece are immersed in a dielectric fluid, which provides insulation against premature spark discharge, cools the machined area, and flushes away the removed material.

One drawback to electrical discharge machining is that it is a relatively slow process, especially when several distinct features need to be machined into a workpiece. This is particularly so in the aircraft engine industry where electrical discharge machining is widely used for machining various features into aircraft engine parts. To increase the manufacturing output of such parts, it is common to use an EDM apparatus that machines a number of parts at one time. Such an apparatus has a plurality of work stations, each of which has a workpiece fixture located in a single dielectric tank. The work stations are all typically connected to a common power supply. Thus, machining takes place in series one part at a time. That is, a spark will be created in the first work station and then the next work station and so on until each station has a spark supplied. This sequence is repeated until the machining operation is completed for each workpiece.

A problem with this type of apparatus is that is whenever one station gets hung up (i.e., fails to discharge for some reason such as electrode misalignment or a EDM particle remaining in the electrode-workpiece gap) all of the stations will become hung up. And since all stations are stopped, it is not evident which station is causing the stoppage. Furthermore, each station must use the same electrode material and polarity because of the series power connection. Thus, each station machines the same feature into the parts. Parts requiring additional features must then be moved to another machine. This means that multiple machines, fixtures and part handling are required before a part is completed. Another inefficiency with these conventional EDM apparatuses is that the dielectric tank must be drained and refilled between each cycle to load and unload the parts because the workpiece fixtures are all located and submerged in the tank.

Accordingly, there is a need for an EDM apparatus that more efficiently machines workpieces having multiple features to be machined therein.

SUMMARY OF THE INVENTION

The above-mentioned need is met by the present invention which provides an electrical discharge machining apparatus including at least one work station having an electrode fixedly mounted to a base and a workpiece fixture slidingly mounted to the base above the electrode. A servomotor is mounted to the base and arranged to drive the workpiece fixture toward and away from the workpiece. Preferably, the EDM apparatus will include a number of such work stations, and each work station will be connected to a separate control system for independently controlling and energizing the work station.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
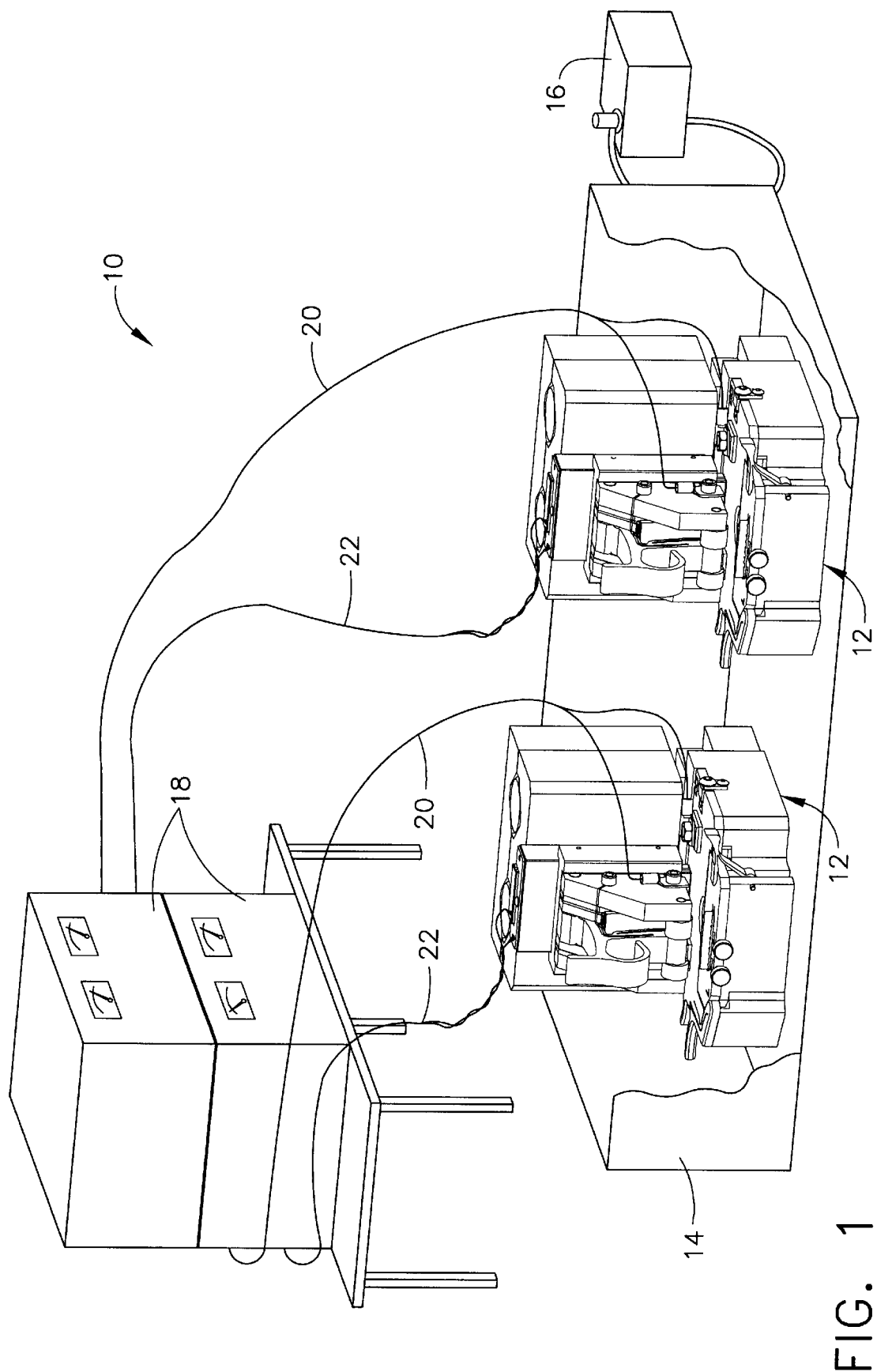
FIG. 1 is a schematic view of the EDM apparatus of the present invention.

Referring to the drawings wherein identical reference numerals denote the same elements throughout the various views, FIG. 1 shows an electrical discharge machining (EDM) apparatus 10. The EDM apparatus 10 includes a plurality of individual work stations 12 disposed in a tank 14, which is shown in partial cut-away to reveal the work stations 12 therein. Although two work stations 12 are shown in FIG. 1 for purposes of illustration, it should be noted that virtually any number of such stations could be employed in the EDM apparatus 10 of the present invention. Each work station 12 operates independently to machine a separate workpiece. As is well known in the field, the tank 14 is filled with a suitable dielectric fluid, such as a dielectric oil, so that the workpiece is immersed in the fluid. The dielectric fluid insulates against premature spark discharge, cools the machined area, and flushes away machining debris. A conventional filtering system 16 is connected to the tank 14 for filtering the dielectric fluid.

The apparatus 10 also includes a standard EDM control system 18 for each work station 12. As is known in the field, each EDM control system 18 includes a power supply or spark generator and a controller, such as a computer numerical control (CNC). The power supply provides energy to the corresponding work station 12 via a power cable 20, and the CNC is connected to the corresponding work station 12 via a servo cable 22 to control workpiece positioning.

Figure 2:
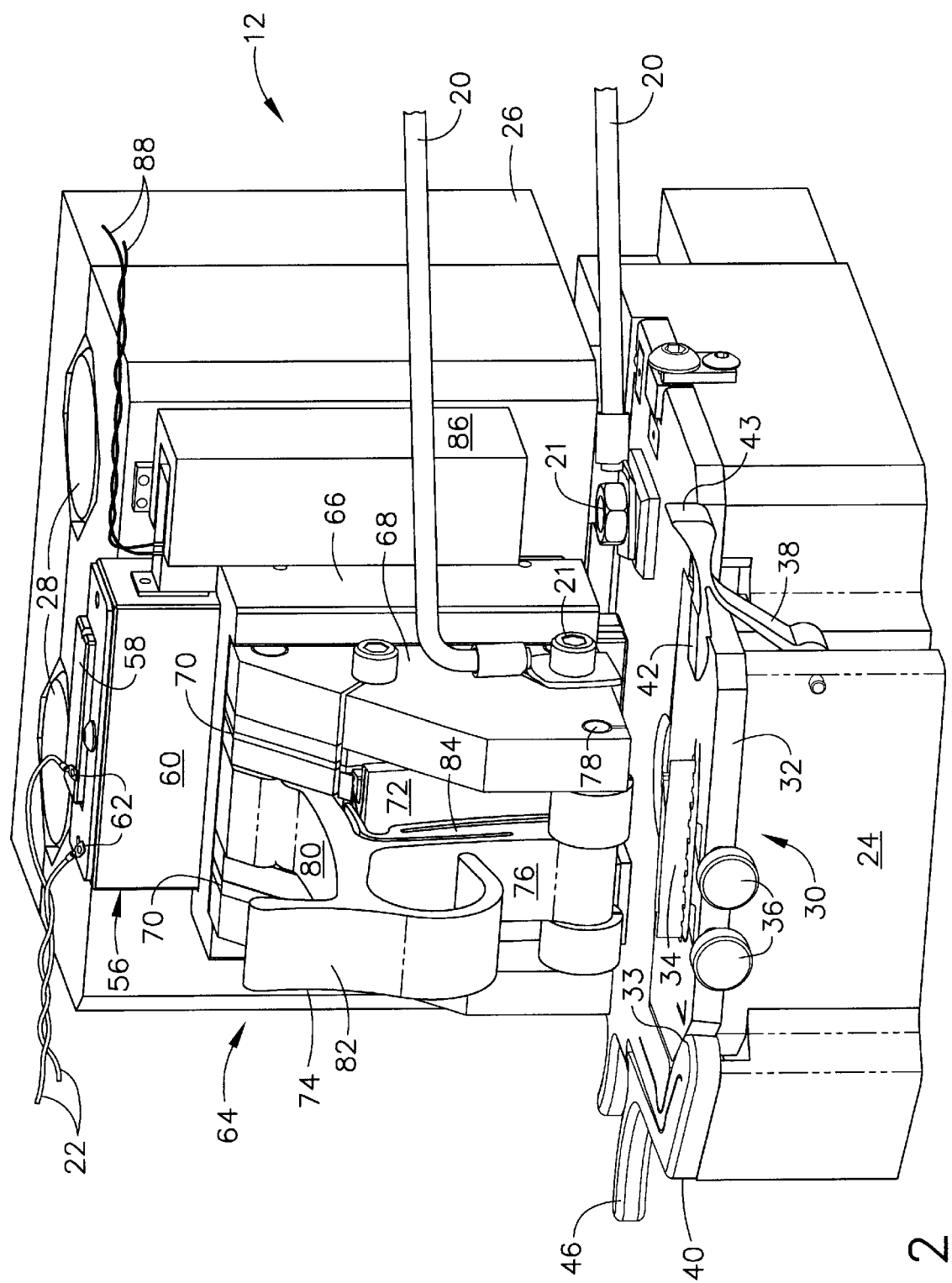
FIG. 2 is a perspective view of one of the work stations of the EDM apparatus of FIG. 1.

Turning to FIG. 2, one of the work stations 12 is shown in more detail. The work station 12 has a two-part base structure comprising an lower base 24 and an upper base 26 that is supported on the lower base 24 by a pair of insulated mounting posts 28. An exchangeable electrode holder 30 is removably supported on the upper surface of the lower base 24. The electrode holder 30 includes a locator plate 32 having an electrode receiving slot formed therein. The locator plate 32 is a substantially rectangular plate made of an electrically conductive material and has one corner cut off to define an angled contact surface 33. An electrode 34 is disposed in the slot and secured by a pair of lock screws 36. Precision alignment of the electrode 34 is thus performed externally of the EDM apparatus 10. The electrode 34 can be any type of electrode used in electrical discharge machining. Electrical energy is delivered to the electrode 34 through the electrically conductive locator plate 32, which is electrically connected to a connector 21 for power cable 20. The locator plate 32 is held in place on the lower base 24 by a spring clip 38 and a loading clamp 40. The spring clip 38 is attached to the lower base 24, below the locator plate 32, and has a protrusion 42 that contacts the top surface of the locator plate 32 and retains it against the lower base 24. A tab 43 is formed on the spring clip 38 to provide a means for operating the clip 38.

Figure 3:
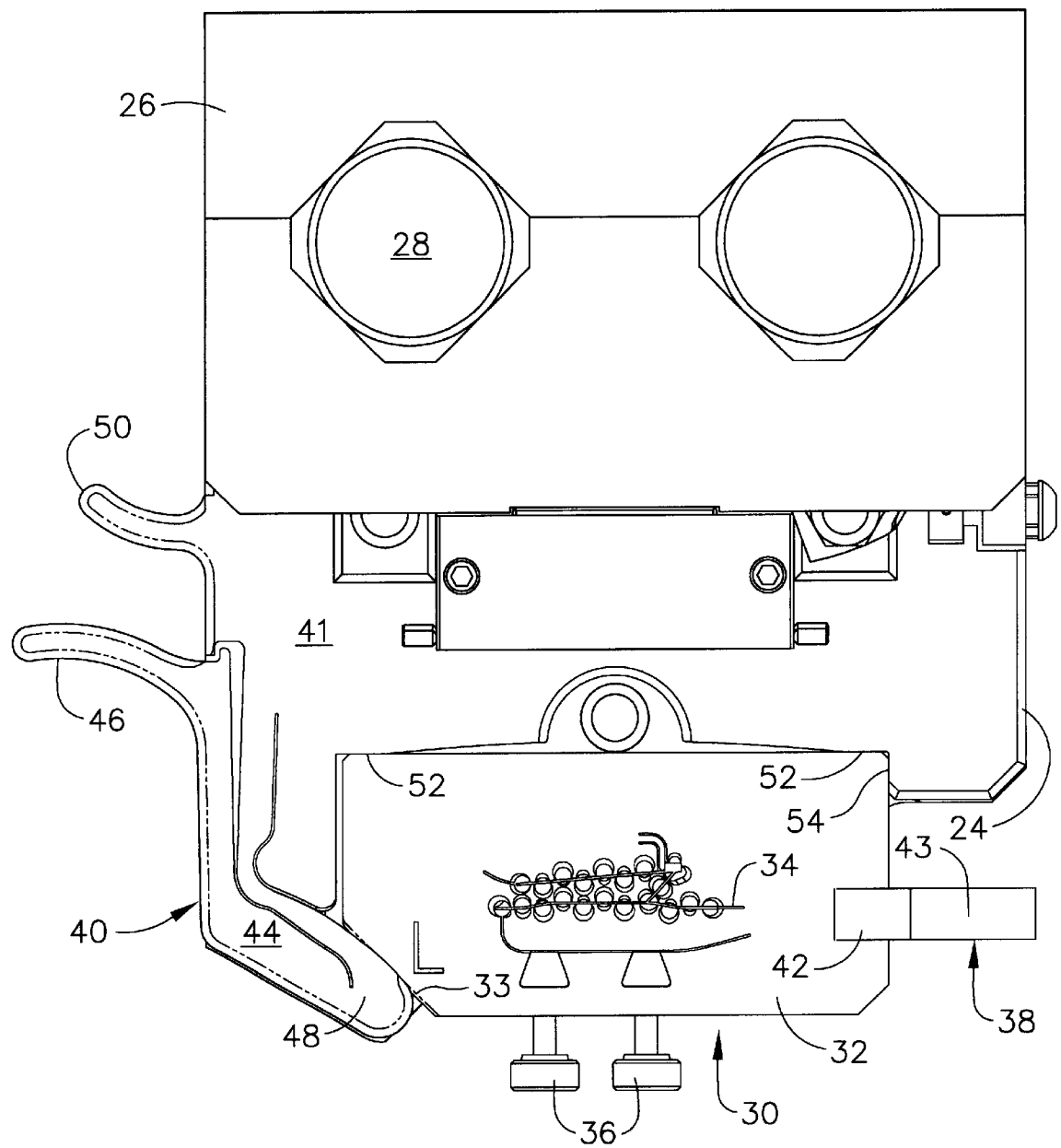
FIG. 3 is a top view of the work station of FIG. 2 with the workpiece fixture removed.

As best seen in FIG. 3, the loading clamp 40 includes a base plate 41 mounted on the upper surface of the lower base 24 and a self spring mechanism 44 formed on the base plate 41. The mechanism 44 has a handle 46 formed on its distal end and defines a clamping arm 48 that is biased in a counterclockwise direction as viewed in FIG. 3. The loading clamp 40 also includes a stationary handle 50 formed on the side of the base plate 41, adjacent to the spring handle 46. The clamping arm 48 is oriented to engage the contact surface 33 so that the locator plate 32 is firmly pressed against abutment surfaces 52 and 54 formed above the lower base 24. The locator plate 32 is pressed against both abutment surfaces 52 and 54, which are oriented perpendicularly to one another, because the contact surface 33 has an angled orientation. Thus, the loading clamp 40 cooperates with the spring clip 38 (which secures the locator plate 32 vertically) to hold the locator plate 32, and thus the electrode 34, in a stationary position on the lower base 24.

The locator plate 32 can be removed and exchanged with another locator plate by pressing the spring clip tab 43 downward so as to disengage the protrusion 42 from the locator plate 32 and pressing the two handles 46 and 50 toward one another, thereby causing the clamping arm 48 to flex in a clockwise direction and release the locator plate 32. This provides a simple means of changing electrodes so that the work station 12 can be used for a different machining operation that calls for a different electrode.

Referring again to FIG. 2, the work station 12 further includes a linear servomotor 56 mounted on the upper base 26. It should be noted that while a linear servomotor is shown in FIG. 2 to facilitate disclosure of the present invention, a rotary servomotor could alternatively be used. However, linear motors are generally preferred because of their better speed, faster frequency response and positional accuracy.

The servomotor 56 comprises a linear motor forcer 58, which is fixedly attached to the upper base 26, and a linear motor U-channel 60, which is slidingly mounted on the forcer 58. The linear servomotor 56 operates in a conventional manner in that when the motor is energized, the U-channel 60 is caused to move linearly with respect to the forcer 58. In this case, the servomotor 56 is arranged vertically on the upper base 26 so that the U-channel 60 will move vertically, toward or away from the electrode 34. The displacement of the U-channel 60 is dictated by signals sent from the CNC in the EDM control system 18 via the servo cable 22 that is coupled to the servomotor 56 at the motor connections 62.

A workpiece fixture 64 is affixed to the U-channel 60 for movement therewith. The fixture 64 includes a support bracket 66 that is fixedly attached to the U-channel 60 and an exchangeable part holder 68 removably mounted on the support bracket 66 so as to be located directly above the electrode 34. The part holder 68 has precision datum rails 70 and a bottom stop block (not shown) extending between the datum rails 70. The datum rails 70 and stop block position a workpiece 72 in the part holder 68. A loading clamp 74 is provided for clamping the workpiece 72 in the part holder 68. The loading clamp 74 comprises a lever arm 76 mounted at one end to the bottom of the part holder 68 by an axle 78 extending between the datum rails 70. The other end of the lever arm 76 has a perpendicularly extending locking arm 80 and a handle 82 formed thereon. The lever arm 76 includes a self spring mechanism 84 that faces the workpiece 72 and pushes it against the datum rails 70.

By pulling or pushing on the handle 82, the loading clamp 74 is pivotable about the axle 78 between a closed position against the workpiece 72 and an open position away from the workpiece 72. When the loading clamp 74 is in its closed position, the locking arm 80 engages the top of the workpiece 72, and the self spring mechanism 84 presses the workpiece 72 against the datum rails 70. Thus, the workpiece 72 is accurately positioned on all sides by the datum rails 70, the stop block and the locking arm 80, and it is held in this position by the spring mechanism 84. The part holder 68 is electrically conductive so as to electrically connect the workpiece 72 to the power cable 20, which is coupled to another connector 21 on the side of the part holder 68. The workpiece 72 can be removed from the part holder 68 when the loading clamp 74 is in its open position. The part holder 68 is limited to one specific workpiece configuration (thereby preventing loading of the wrong workpiece into the work station 12), but the removable mounting of the part holder 68 to the support bracket 66 means it can be readily exchanged with another part holder that supports a different workpiece configuration.

A linear measuring scale 86 is mounted adjacent to the servomotor 56. The linear measuring scale 86 is a conventional device that precisely measures the position and velocity of the U-channel 60 and provides feedback of these measurements to the CNC in the EDM control system 18 via cables 88.

In operation, the workpiece fixture 64 is retracted from the dielectric fluid in the tank 14 by the linear servomotor 56. A new workpiece 72 is loaded into the part holder 68, and the loading clamp 74 is closed. The linear servomotor 56 advances the workpiece 72 toward the electrode 34 under the control of the EDM control system 18 so that it becomes immersed in the dielectric fluid. The electrode 34 is energized by the power supply in the EDM control system 18 for providing electrical energy to produce electrical discharges or sparks between the electrode 34 and the workpiece 72 when the workpiece 72 is positioned adjacent to the electrode 34. As the sparks vaporize the workpiece material, the servomotor 56 continues to advance the workpiece 72 as dictated by the EDM control system 18 until the desired feature is finished. When the machining operation is completed, the servomotor 56 once again retracts the workpiece fixture 64 and workpiece 72 out of the dielectric fluid and EDM power is switched off so that the machined workpiece 72 can be removed by opening the loading clamp 74, and the work station 12 is ready for the next cycle.

Referring again to FIG. 1, it can be seen that instead of operating in series, one spark at a time, the multiple work stations 12 of the EDM apparatus 10 operate independently because each station 12 has its own EDM control system 18, which includes a power supply and a servocontrol. Thus, the work stations 12 can perform different operations; that is, each station 12 can work on a different type of part and/or machine a different feature. More specifically, each work station 12 can have a different type of electrode 34 (e.g., one station can have a graphite electrode, while other stations have use brass, copper or copper tungsten electrodes) and use different electrode polarities Additionally, a work station 12 could be configured to perform rotational electrical discharge machining while other work stations perform linear electrical discharge machining.

Furthermore, because the workpiece 72 is supported above the electrode 34 by the retractable workpiece fixture 64, workpieces 72 can be removed individually instead of all at one time, and without the need of draining the dielectric fluid from the tank 14. This is particularly advantageous when the work stations 12 are performing different machining operations because if one station finishes before another, then the completed part can be removed and a new cycle started while the other stations are still operating. Positioning the workpiece 72 above the electrode 34 also aids removal of machining debris, making it less likely that one of the stations will get hung up. But if such a problem does occur, only the affected work station 12 will be stopped. Unlike a conventional EDM apparatus, the other work stations 12 will continue to operate because they have independent power supplies. This not only lessens the impact of a shut down on the total production rate, but also makes it readily apparent which station is encountering the problem, thus greatly facilitating trouble shooting.

The foregoing has described an EDM apparatus that more efficiently machines workpieces, particularly aircraft engine parts, having multiple features. While specific embodiments of the present invention have been described, it will be apparent to those skilled in the art that various modifications thereto can be made without departing from the spirit and scope of the invention as defined in the appended claims.

What is claimed is:

1. An electrical discharge machining apparatus comprising:
   a base;
   an electrode fixedly mounted to said base;
   a workpiece fixture slidingly mounted to said base above said electrode; and
   a servomotor mounted to said base and arranged to drive said workpiece fixture.

2. The electrical discharge machining apparatus of claim 1 wherein said servomotor is a linear servomotor having a forcer fixedly attached to said base and a U-channel slidingly mounted on said forcer, and wherein said workpiece fixture is affixed to said U-channel.

3. The electrical discharge machining apparatus of claim 2 wherein said linear servomotor is arranged vertically so that said workpiece fixture will be moved vertically, toward and away from said electrode.

4. The electrical discharge machining apparatus of claim 2 wherein said workpiece fixture includes a support bracket fixedly attached to said U-channel and a part holder removably mounted on said support bracket.

5. The electrical discharge machining apparatus of claim 4 wherein said part holder includes datum rails for locating a workpiece therein and a loading clamp for clamping a workpiece thereto.

6. The electrical discharge machining apparatus of claim 1 further comprising an electrode holder for mounting said electrode to said base.

7. The electrical discharge machining apparatus of claim 6 wherein said electrode holder includes a locator plate having a slot for receiving said electrode and means for securing said electrode to said locator plate.

8. The electrical discharge machining apparatus of claim 7 further comprising a loading clamp and a spring clip for removably mounting said locator plate to said base.

9. The electrical discharge machining apparatus of claim 1 wherein said base is a two-part structure having a lower base and an upper base supported on said lower base, and wherein said electrode is fixedly mounted to said lower base and said workpiece fixture is slidingly mounted to said upper base.

10. The electrical discharge machining apparatus of claim 1 further comprising a power supply for energizing said electrode and a controller for controlling workpiece positioning via said servomotor.

11. An electrical discharge machining apparatus comprising:
   a plurality of control systems; and
   a plurality of work stations, each one of said work stations being connected to a respective one of said plurality of control systems, and each one of said work stations comprising:
      a base;
      an electrode fixedly mounted to said base;
      a workpiece fixture slidingly mounted to said base; and
      a servomotor mounted to said base and arranged to drive said workpiece fixture.

12. The electrical discharge machining apparatus of claim 11 further comprising a dielectric tank, wherein each one of said plurality of work stations is disposed in said tank.

13. The electrical discharge machining apparatus of claim 11 wherein for each work station said servomotor is a linear servomotor having a forcer fixedly attached to said base and a U-channel slidingly mounted on said forcer, and wherein said workpiece fixture is affixed to said U-channel.

14. The electrical discharge machining apparatus of claim 13 wherein for each work station said linear servomotor is arranged vertically so that said workpiece fixture will be moved vertically, toward and away from said electrode.

15. The electrical discharge machining apparatus of claim 13 wherein for each work station said workpiece fixture includes a support bracket fixedly attached to said U-channel and a part holder removably mounted on said support bracket.

16. The electrical discharge machining apparatus of claim 15 wherein for each work station said part holder includes datum rails for locating a workpiece therein and a loading clamp for clamping a workpiece thereto.

17. The electrical discharge machining apparatus of claim 11 wherein each work station further comprises an electrode holder for mounting said electrode to said base.

18. The electrical discharge machining apparatus of claim 17 wherein for each work station said electrode holder includes a locator plate having a slot for receiving said electrode and means for securing said electrode to said locator plate.

19. The electrical discharge machining apparatus of claim 18 wherein each work station further comprises a loading clamp and a spring clip for removably mounting said locator plate to said base.

20. The electrical discharge machining apparatus of claim 11 wherein for each work station said base is a two-part structure having a lower base and an upper base supported on said lower base, and wherein said electrode is fixedly mounted to said lower base and said workpiece fixture is slidingly mounted to said upper base.

21. The electrical discharge machining apparatus of claim 11 wherein each one of said plurality of control systems includes a power supply for energizing the corresponding electrode and a controller for controlling workpiece positioning via the corresponding servomotor.

22. A method of electrical discharge machining a workpiece on an electrical discharge machining apparatus having an electrode fixedly mounted to a base and a workpiece fixture slidingly mounted to said base, said method comprising the steps of:

loading a workpiece into said workpiece fixture;

advancing said workpiece fixture and said workpiece toward said electrode so that said workpiece fixture and said workpiece become immersed in a dielectric fluid; and subsequently retracting said workpiece fixture and said workpiece from said dielectric fluid.

23. The method of claim 22 wherein said steps of advancing and retracting said workpiece fixture and said workpiece are performed with a servomotor mounted to said base.

\* \* \* \* \*